Patented Sept. 8, 1953

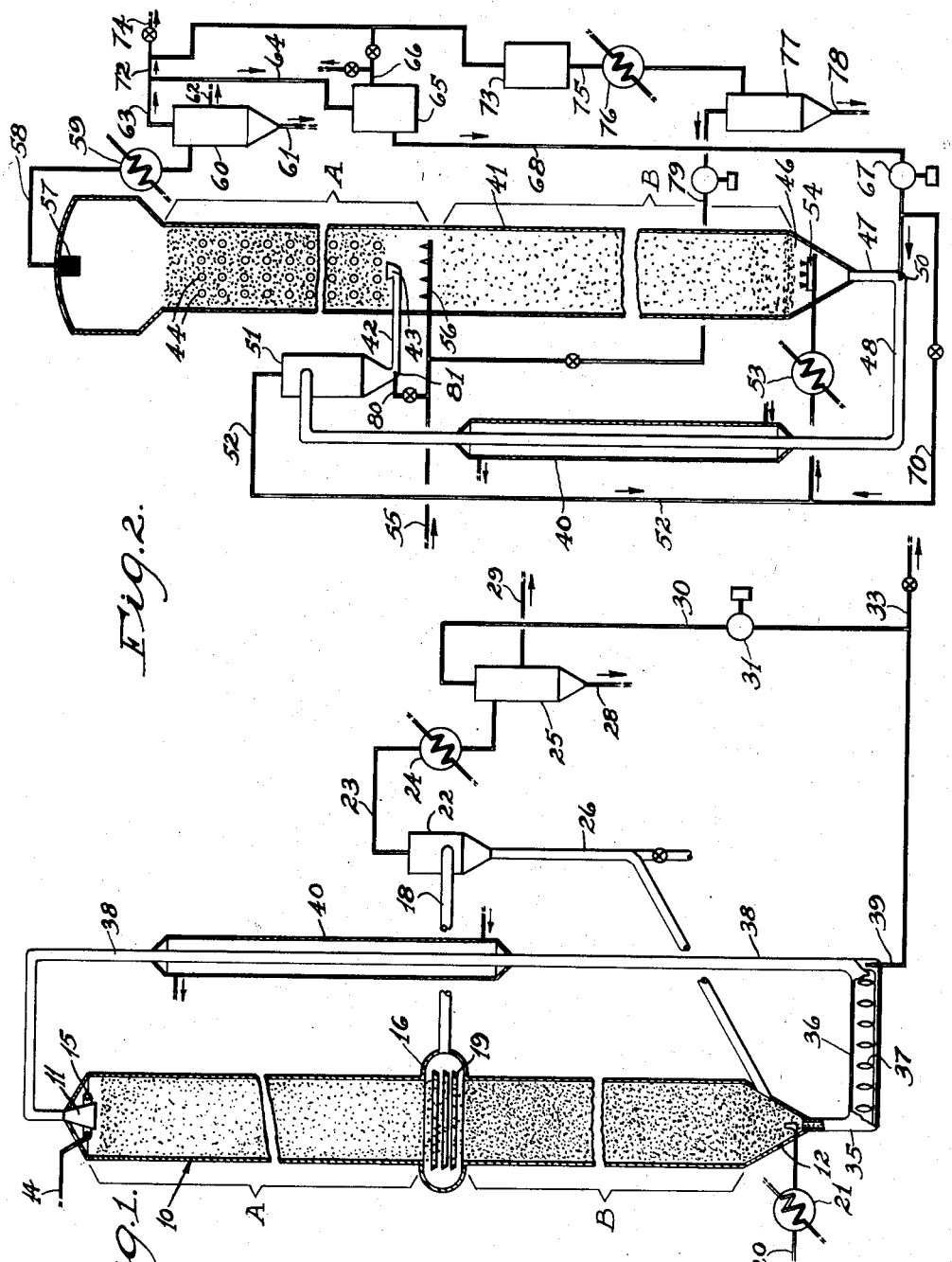

2,651,652

UNITED STATES PATENT OFFICE 2,651,652

CATALYTIC SYNTHESIS OF HYDROCARBONS AND OXYGENATED ORGANIC COMPOUNDS

Eugene E. Sensel, Beacon, N. Y., assignor to The Texas Company, New York, N. Y., a corporation of Delaware Application September 16, 1947, Serial No. 774,246

3 Claims. (Cl. 260—449)

The present invention relates to the catalytic conversion of hydrogen and carbon monoxide into desired hydrocarbons, oxygenated hydrocarbons and the like, and is more particularly concerned with effecting consecutive catalytic reaction and the regeneration of solid particulate catalyst while the particles are in discrete, dispersed condition in which adherence into agglomerated masses is avoided.

In the synthesis of hydrocarbons as above, the catalytic interaction of the gasiform reactants tends to be accompanied by the formation of adherent, sticky deposits on the catalytic surfaces which impair catalytic activity and foul the contact mass. This is particularly objectionable at moderate temperatures otherwise highly desirable for production of predominantly liquid products.

Revivification of the catalyst may be effected by washing with a suitable solvent, or by treatment with a suitable stripping gas, such for example as so-called hydrogen cracking, carried out at elevated temperatures either periodically in the reactor, or continuously in a suitable revivification zone to which the catalyst is cycled, revivified, and thereafter recycled to the reaction zone.

However, the tendency of the waxy deposits to cause agglomeration of the particles into adherent groups causes obvious mechanical difficulties during the treatment steps. Thus it becomes difficult if not impossible to handle the catalyst for dewaxing. In particular, surface contact of gaseous treating agents with the agglomerated catalyst may be so impaired as to render regeneration impractical.

While the formation of waxy deposits may be overcome to some extent by operation at relatively high temperatures, this usually results in excessive yield of normally gaseous hydrocarbons at the expense of desired liquid fractions. Moreover, such temperatures may be accompanied by mechanical disintegration of the catalyst and accumulation thereon of coke-like deposits. This not only represents a serious waste of reactant feed material, but may frequently result in loss of the resulting fine particles of catalyst in the product stream.

The present invention overcomes these defects by dropping catalyst as discrete, dispersed particles downwardly through successive reaction and regeneration zones, wherein the particles are subjected respectively to contact with the reactant gases for the formation of desired products, and thereafter to contact with suitable stripping or revivification gases. To this end, catalyst particles are distributed, by any appropriate means, preferably such as to introduce the particles in a uniform shower, from the upper region of a vertically extending chamber or tower of suitable height. During the initial portion of their path of fall, the particles are contacted by a stream of reactant gases and the reaction products are continuously withdrawn. Continuing in dispersed condition, the particles gravitate through a revivification zone where they are contacted by a stream of stripping gas, effective to remove the waxy deposits.

Operating in this manner, it is apparent that viscous or waxy deposits formed during the limited contact are sufficiently stripped or removed before the catalyst reaches the bottom of its path of fall. In other words, the catalyst particles are kept apart by dispersion of the particles from commencement of synthesis until removal of the waxy deposits when the catalyst powder may be permitted to compact, cooled if desired, and handled mechanically or by any other suitable means in connection with further treatment, or for return to the upper portion of the tower, all without danger of adhering into an agglomerated mass.

Catalyst contact with the reactants, moreover, is subject to control so that the wax deposit is small, and thus readily removable by correspondingly limited treatment in the revivification zone. When wax deposits are thus limited, it has been found that stripping by means of so-called hydrogen cracking or with an inert, light gas is more rapid and effective.

The streams of gaseous reactants and revivifying gas may flow either concurrently or countercurrently to the falling particles of catalyst. When countercurrent contact is employed in both zones, the residual stripping gases from the revivification zone may continue upwardly through the reaction zone as a common stream with the reactants. This is advantageous where the effluent stripping gas comprises a constituent such as hydrogen or recycle gas, containing hydrogen as a major component, useful in the synthesis reaction.

On the other hand, with concurrent flow in the reaction zone and countercurrent contact in the revivification zone, the effluent gases may be withdrawn at a central point in the path of catalyst fall. This has the advantage that localized catalyst overheating is prevented. Thus, instead of subjecting hot catalyst surfaces continuously to reactants of high or increasing reactant concentration, the catalyst moves along with reactant gas of progressively diminishing concentration.

Countercurrent flow of the reactants with respect to the catalyst, however, affords some control of the rate of catalyst fall, and accordingly its residence time within the reaction zone. While it is contemplated that the rate of upflow of reactants shall never exceed the rate of free fall of catalyst, nevertheless, with an approach to this condition, the actual catalyst residence time may be increased within wide limits.

Usually stripping, and particularly hydrogen dewaxing, is carried out at temperatures somewhat above the temperature of hydrocarbon synthesis, and accordingly, provision is made for holding the revivification zone at an appropriate elevated temperature. This may be realized by a suitably preheated stripping gas, or by internal heating or cooling surfaces. Where the countercurrent gaseous stream from the stripping zone continues through the reaction zone, temperature reduction to the lower level appropriate of the reaction zone may be effected by introducing the reactant gas stream above the regeneration zone at a suitably low temperature at which the hot effluent gases from the regeneration zone are quenched to synthesis temperature. Moreover, suitable cooling surfaces may be provided in the reaction zone.

In the embodiment where the reactant gases pass concurrent to the falling catalyst in the synthesis zone, and the stripping gases pass countercurrently in the stripping zone, it is apparent that no difficulty is encountered since respectively different temperature levels may be maintained in the two zones if the inlet temperatures of respective gaseous streams are properly selected. Moreover, under the exothermic conditions in the reaction zone, the catalyst approaches a temperature suitable for revivification. Therefore, the zones may be maintained at any predetermined temperature.

In order to describe the invention in greater detail, reference is had to the accompanying drawing, wherein Figure 1 discloses more or less diagrammatically one illustrative embodiment of the invention, and Figure 2 is directed to an alternative modification.

In Figure 1, upstanding cylindrical tower 10 is continuously supplied, through a conical dispersing orifice 11, with a shower of falling, finely divided discrete particles of catalyst, uniformly dispersed throughout the cross section of the tower, dropping freely through a predetermined path of fall into conical bottom portion 12 of the tower. The expanding nozzle 11 forms no part of the invention, per se, and may take the form of any type of distributing nozzle or other mechanical means effective to shower or disperse falling particles uniformly across the cross section of the tower.

A synthesis gas feed, comprising hydrogen and carbon monoxide, is introduced from any suitable source not shown, through inlet pipe 14 to a distributing head 15, and passes downwardly with the catalyst through the upper or reaction zone designated by the letter A. At the bottom of the reaction zone, the gasiform reaction products are withdrawn through a bustle chamber 16 into a product line 18. Preferably, the inner face of the bustle conduit or chamber 16 is composed of a plurality of vertically spaced annular baffles 19, inclined upwardly and outwardly of the central axis of the tower to separate and deflect impinging catalyst particles into the central portion of the chamber.

In the lower portion of the tower, designated by the letter B, the catalyst particles fall through an upflow of stripping gas introduced from any suitable source not shown through inlet pipe 20. The stripping gas, preferably hydrogen or hydrogen-rich gas, passes upwardly through any accumulated catalyst in the lower portion of the tower, maintaining it in an aerated, fluent condition convenient for subsequent handling, and thence upwardly through the falling shower of catalyst particles where hydrogen cracking and removal of the waxy deposit and carbon takes place.

As intimated above, the revivification zone is preferably operated at a relatively high temperature, and to this end, heat exchange means 21 is provided to preheat the stripping gas to stripping temperature.

The effluent stripping gas passes outwardly through the bustle conduit 16 concurrently with the products of the reaction zone. Obviously, circumferentially placed filters or any other suitable outlet means may be employed.

The combined streams pass through a separator 22, and discharge through pipe 23 and condenser 24 into separator 25.

Any separated particles of catalyst from cyclone 22 are returned to the catalyst reservoir in the lower portion of the tower by means of standpipe 26, as shown. Provision, not shown, may be made for supplementing or discarding any portion thereof to maintain catalyst activity.

Separator 25 effects physical recovery of the aqueous products of reaction as at 28, and oily products of reaction as at 29, from the normally gaseous products discharged overhead through pipe 30.

Pipes 28 and 29 may lead to any desired product treatment or recovery instrumentalities which, per se, form no part of the present invention, and therefore are not disclosed.

The gaseous products of reaction are recycled in substantial part through gas pump 31 to the reaction zone. In the embodiment shown, valved branch pipe 33 permits any appropriate portion of these gases to be vented from the system. Moreover, hydrocarbon absorption means or the like, not shown, may be provided in pipe 30 for recovery of desired hydrocarbon gases from the recycle stream. The remainder performs the additional function of lifting or elevating the catalyst for circulatory passage through the reactor. To this end, accumulated catalyst in the lower portion 12 of the tower is withdrawn through standpipe 35 and transferred through tube 36 by means of a screw or other conveyor 37, into the lower portion of an elevating standpipe 38. Here the stream of recycle gas from pipe 30, passing through an injection nozzle 39, aerates the particles, lifting them upwardly through pipe 38 and ejecting them from nozzle 11 as above disclosed.

In operation, therefore, it will be apparent that the catalyst is continuously cycled upwardly to the top of the tower, is permitted to gravitate in the form of dispersed, spaced particles through an atmosphere of reactant gases where it accumulates a film of carbonaceous deposit and continues to drop in contact with a stream of revivifying gas. The particles substantially free of waxy and/or carbonaceous deposits collect in the bottom portion of the chamber and during the course of subsequent elevation are cooled by the relatively low temperature elevating gas to a level appropriate for catalysis. Indirect cooling means, such as cooling jacket 40, is also provided for this purpose. Of course, the invention in its broadest aspect may employ any suitable mechanical or other type of elevator in lieu of, or as a complement to, the gaseous lift designated by numeral 38 illustrated above.

In the embodiment of Figure 2, catalyst powder is injected upwardly into tower 41 through pipe 42 terminating in nozzle 43, under the impulse of a suitable gaseous stream. After passing upwardly to a predetermined elevation, the particles gravitate downwardly through the tower, as before. Section A of tower 41 is provided in this case with a series of spaced, horizontally extending tubes 44 supplied, by means of headers not shown, with a stream of any suitable coolant, such as Dowtherm, or water under pressure, presenting cooling surfaces effective for temperature control within the reaction zone. Falling particles impinging the tubes are deflected laterally with the same resultant, overall uniformity of distribution as discussed above. After gravitating through zone B, the catalyst accumulating in the lower portion of the tower as indicated at 46 gravitates through standpipe 47 into conduit 48, where recycle gas, from which carbon dioxide and higher gaseous hydrocarbons have been preferably removed, as above, supplied through injector 50, lifts it into hopper 51, where the recycle gas is separated and withdrawn overhead through pipe 52 for injection into the lower portion of revivification zone B by way of preheater 53 and distributing head 54.

Fresh feed synthesis gas is introduced through inlet pipe 55 and distributing head 56 at the lower portion of the reaction zone A, where it intermingles with the effluent from the stripping zone B, and passes upwardly, passing ultimately through separating filter 57, and outlet conduit 58. As before, condenser 59, separator 60 permit isolation of the aqueous and oily products of reaction, as at 61 and 62 respectively. The residual gas stream withdrawn through pipe 63 is split into two flows, the first passing through branch pipe 64 to a gas separation plant 65, of the Girbotol type where carbon dioxide is removed by absorption with triethanolamine or the like, and is withdrawn through pipe 66. The residual stream, from which the carbon dioxide has been removed, passes through gas pump 67 and pipe 68 to the injector 50 aforementioned.

In operation of this embodiment, this stream performs the multiple function of actuating the catalyst lift, regenerating catalyst, and adjusting the total reactant feed to the reaction zone in a manner which promotes improved yields of liquid hydrocarbons. Its effectiveness as a stripping gas follows from the fact that the effluent gaseous products of reaction in the usual synthesis operation usually have a small or negligible carbon monoxide content, and are relatively high in hydrogen. This is particularly true where an iron synthesis catalyst is employed with typical fresh feed gases containing $H_2$ and $CO$ in the relative molar order of 2:1 or greater. Thus it affords an effective stream comprising essentially hydrogen, for the so-called "hydrogen dewaxing" mentioned above. If desired, the stream may be stripped of gaseous hydrocarbons by adsorption, or otherwise in gas plant 65. Moreover, valved branch pipe 70 permits any portion of the stripping gas in excess of that required to elevate the catalyst, to be diverted directly into the stripping zone via pipe 52, exchanger 53 and distributor 54. However, any other suitable inert stripping gas may be employed, such for example, as steam, methane or many others.

The remainder of the gas from the pipe 63 passes through pipe 72 to a water gas shift converter 73, after discarding any desired portion thereof through valved outlet pipe 74. The stream reaching shift converter 73 may be supplemented by all or any portion of the carbon dioxide in pipe 66 as shown.

The shift converter comprises a catalytic chamber provided with any suitable water gas shift catalyst, such as nickel or iron oxide, operated at a temperature above 1000° F., preferably as high as 1500° F., or higher. Under these conditions, the mixed stream of gases supplied to the converter, comprising essentially carbon dioxide and hydrogen, is converted largely into water vapor and carbon monoxide. Accordingly, the effect is to reform carbon monoxide, which, together with the high residual hydrogen, typical of operation under conditions where there is substantial formation of carbon dioxide in the synthesis reaction zone, provides a supplemental synthesis gas.

The reformed stream, withdrawn through pipe 75, is passed through condenser 76 and separator 77, where contained water vapor is removed through pipe 78, and the residual dry gas recycled by line 79 to the fresh feed synthesis gas inlet pipe 55 to supplement the feed. As indicated above, this arrangement is particularly effective where iron is employed as the synthesis catalyst acting on a synthesis gas wherein the molar ratio of hydrogen to carbon monoxide exceeds 1:1 and preferably is above about 2:1.

Particular attention is directed to the fact that a portion of the fresh feed synthesis gas from pipe 55 is advantageously diverted through branch pipe 80 and passes through injection nozzle 81 into the conduit 45 to effect ejection and upward dispersal of the catalyst through the nozzle 43 as previously mentioned. This feature is of particular advantage in that the expanding gases not only project and shower the catalyst particles upwardly, but, being rich in hydrogen and carbon monoxide, desirably condition the particles by initial, strongly carbiding effect, so that active promotion of the synthesis reaction is instigated.

In this embodiment, hot stripping gas is introduced at 54 at a temperature suitable for hydrogen dewaxing, for example, within the range of from 380 to 900° F. Fresh feed gases are introduced by line 55 at an appropriate lower temperature such that the overall mixed gases introduced to the lower portion of zone A have a temperature optimum for the synthesis reaction, which as indicated above, is preferably below 650° F., usually between 350 and 620° F., and most advantageously in the range of 570 to 620° F. Cooling surfaces are provided to maintain desired temperatures. Similarly, the relatively cool recycle stream or other appropriate cooling means, such as the cooling jacket 40, lowers the temperature of the hot, withdrawn catalyst to any desired level for reaction in the zone A.

In accordance with one example embodying the principles of the present invention, a shower of freely falling, dispersed particles is caused to gravitate downwardly through a cylindrical tube. The tube is approximately four inches in diameter and about eighteen feet in height. The catalyst is composed of iron, promoted with alumina and potassia, and has a particle size of approximately 60 to 140 mesh.

A synthesis gas comprising essentially two parts by volume of hydrogen to one part by volume of carbon monoxide is introduced into the middle part of the tower at a rate of about 20 to 40 standard cubic feet of gas per hour per pound of catalyst in the reaction zone at a given time, or at the approximate rate of one-half to one foot per second initial upward travel. This gas is subsequently withdrawn from an outlet at the top portion of the tower. Simultaneously, a flow of hydrogen is introduced into the bottom of the tower, passes upwardly at approximately the rate of 0.5 to 1 foot per second, and is withdrawn concurrently with the stream of reaction products of the upper zone.

Temperature in the upper zone is maintained in the range of from about 590 to 620° F. The hydrogen entering the lower stripping zone is preheated to a temperature of about 800 to 900° F. The catalyst collecting in the bottom of the tower is continuously withdrawn by mechanical means, and returned to the top as a dispersed phase of gravitating particles. Pressure is maintained at about 150 to 200 p. s. i. g. The combined product stream is cooled and separation made between the normally gaseous and normally liquid products, resulting in an oily hydrocarbon-rich layer to the extent of about 200 cc. for each cubic meter of fresh feed gas charged.

Over extended periods of operation, the catalyst powder withdrawn from the tower retains its original, loose, unaltered particulate character free from any appreciable waxy, oily or carbonaceous deposits, as well as from any tendency to pack or agglomerate.

It will be understood that other hydrocarbon synthesis catalysts such as those of the iron group or ruthenium may be substituted for that mentioned in the foregoing example. Most advantageously, iron itself is preferred, either in the supported condition, or else, as above, in the essentially unsupported form. Use of the usual activators and promoters, such for example, as alkali metal and alkaline earth metal oxides, alumina, zirconia, titania, magnesia and the like is also contemplated.

Obviously, the particle size, shape and density of the catalyst affects the rate of fall and accordingly, the catalyst residence time as mentioned above, particularly in the case of countercurrent reactant flow. These may be readily correlated by anyone skilled in the art to effect predetermined contact and residence times, the preferred conditions being readily determinable by trial. Usually, a catalyst particle size of from about 60 to 200 mesh or smaller is suitable.

While the invention, as indicated above, permits hydrocarbon synthesis at desirably low temperatures where wax formation otherwise introduces a difficulty, it may also be used in operations at higher temperatures, for example, as high as 700° F. and above.

The invention is particularly applicable to the so-called "oxo" process, wherein carbon monoxide and hydrogen are caused to react catalytically and under pressure with an olefin with the production of higher molecular weight oxygenated hydrocarbons.

While certain preferred flow relationships have been disclosed above, respecting the gaseous streams and the catalyst, these may be subject to wide variation. For example, the regenerating gas may flow upwardly countercurrent to the catalyst and be withdrawn at the top of the stripping zone, the reactant feed being introduced thereabove and continuing upwardly. So also, this arrangement may be reversed with simultaneous downflow of both gas streams.

Obviously, many modifications and variations of the invention as hereinbefore set forth may be made without departing from the spirit and scope thereof, and therefore only such limitations should be imposed as are indicated in the appended claims.

I claim:

1. In the synthesis of hydrocarbons, oxygenated hydrocarbons and mixtures thereof wherein a synthesis gas mixture of hydrogen and carbon monoxide is passed in contact with a hydrocarbon synthesis catalyst under reaction conditions such that sticky deposits are formed on the surface of the catalyst, the improvement which comprises continuously maintaining a gravitating shower of dispersed, solid particle catalyst downwardly through a vertical reaction chamber of substantial height, said shower comprising freely falling catalyst particles continuously gravitating from the upper portion to the bottom portion of said reaction chamber in dispersed spaced relationship through a substantially open and uninterrupted vertical space, feeding said reactants into the upper portion of said reaction chamber, passing said reactants downwardly concurrently with said gravitating catalyst under said reaction conditions to form an effluent reactant stream including said desired products of reaction, injecting into the lower portion of said reaction chamber a stream of hydrogen substantially free from carbon monoxide and passing said hydrogen stream upwardly counter-currently to the gravitating shower of catalyst therein at a temperature effective to strip said sticky deposits from the catalyst, simultaneously withdrawing as a mixed product stream, the effluent reactant stream and the effluent stripping gas stream from a point intermediate of the vertical elevation of said reaction chamber, rich in hydrogen, carbon dioxide, water vapor and said desired products of reaction, and recovering said products of reaction.

2. The method according to claim 1 wherein catalyst particles collecting at the lower extremity of said reaction chamber are continuously recycled to the top of said reaction chamber to form said catalyst shower.

3. The method according to claim 1 wherein the water vapor and desired products of reaction are separated from said withdrawn mixed product stream and the resulting stream rich in hydrogen and carbon dioxide is thereafter passed in contact with a water-gas-shift catalyst at an elevated temperature above about 1000° F. at which said carbon dioxide and a portion of said hydrogen react to form an additional synthesis gas comprising hydrogen and carbon monoxide, and wherein the additional synthesis gas thus formed is supplied as a supplemental reactant feed to the upper portion of said reaction chamber.

EUGENE E. SENSEL.

References Cited in the file of this patent

UNITED STATES PATENTS

| Number | Name | Date |
| --- | --- | --- |
| 2,234,941 | Keith, Jr. | Mar. 11, 1941 |
| 2,256,969 | Barr | Sept. 23, 1941 |
| 2,289,731 | Roelen et al. | July 14, 1942 |
| 2,309,034 | Barr | Jan. 19, 1943 |
| 2,340,878 | Holt et al. | Feb. 8, 1944 |
| 2,347,682 | Gunness | May 2, 1944 |
| 2,351,214 | Kaufmann et al. | June 13, 1944 |
| 2,353,600 | Sweetser | July 11, 1944 |
| 2,391,434 | McAfee | Dec. 25, 1945 |
| 2,411,592 | Reeves | Nov. 26, 1946 |
| 2,436,957 | Eastman | Mar. 2, 1948 |
| 2,533,666 | Gunness | Dec. 12, 1950 |